United States Patent Office 3,367,882
Patented Feb. 6, 1968

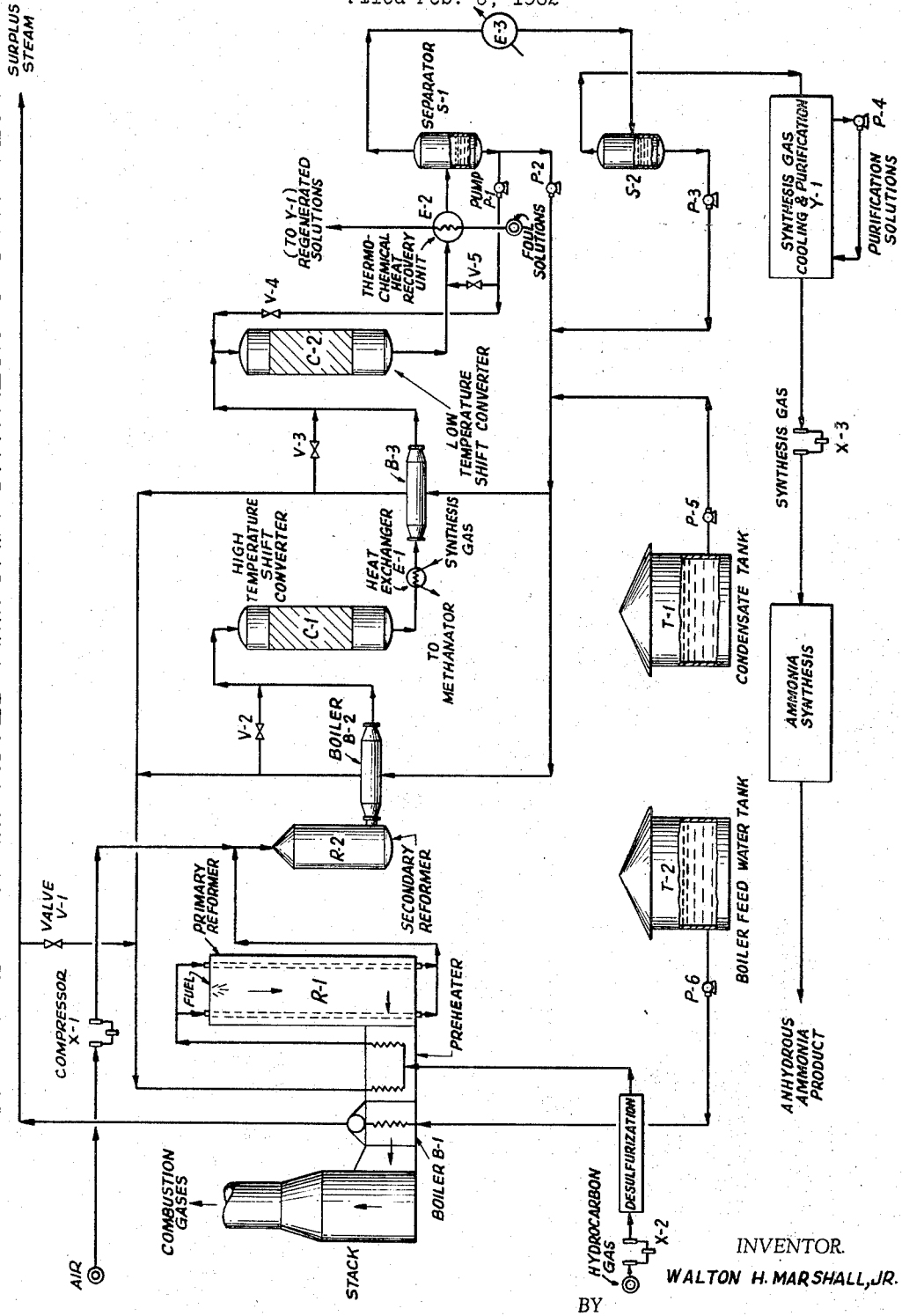

3,367,882
AMMONIA SYNTHESIS GAS PROCESS
Walton H. Marshall, Jr., Laurel Grove,
Downings, Va. 22452
Filed Feb. 8, 1962, Ser. No. 171,990
The portion of the term of the patent subsequent to
Mar. 11, 1980, has been disclaimed
3 Claims. (Cl. 252—376)

This invention is an improvement in the process of the catalytic reforming of hydrocarbons to produce synthesis gas for use in the manufacture of synthetic ammonia.

The basic process for catalytically reforming hydrocarbons consists essentially of (1) primary catalytic reforming with steam of a hydrocarbon, such as methane, propane or a heavier hydrocarbon, or mixtures thereof, (2) secondary catalytic reforming with air of the product from primary reforming, and (3) shift conversion of the product from secondary reforming.

After shift conversion, steam is condensed and contains small but objectionable amounts of fixed nitrogen compounds produced in the step of shift conversion. These compounds interact with carbon dioxide in the condensed steam, to form compounds such as ammonium carbonate, and create a pollution problem if the condensate is discarded. It is customary, therefore, to subject the process condensate to degasification and expensive chemical or ion exchange treatment before reusing it as boiler-feed water.

My invention avoids expensive processing of condensate by vaporizing it and recycling it to primary reforming and thereby converting the contaminants therein into products useful in the synthesis gas process. When the preferred conditions of my invention are used, there is simultaneously also rendered available at a high temperature level excess heat which is capable of producing an unusually large quantity of high-pressure, uncontaminated by-product steam for use in the synthesis gas and ammonia plant.

In the accompanying figure, the single illustration is a flow sheet showing schematically a typical way to carry out the basic reforming process and to incorporate in a preferred manner the improvement which is my invention. Referring to the figure, a normally gaseous hydrocarbon, such as natural gas which is predominantly methane, is compressed at X-2 and may be desulfurized where necessary to protect catalysts used in subsequent steps. A waste heat boiler, B-1, is used to generate steam from the combustion gases from the primary reformer furnace, R-1, before they are exhausted to the stack.

A mixture of hydrocarbon and steam is delivered to the primary reformer furnace tubes which are externally fired. These tubes contain suitable catalysts, such as nickel-bearing compounds, which convert the hydrocarbon to hydrogen and carbon oxides. With sufficient catalyst volume in the primary reformer furnace, R-1, exit gas composition corresponds very closely to the chemical equilibria involved, and normally 65–85% of the hydrocarbons are converted to hydrogen and carbon oxides. Heavier hydrocarbons, from ethane to pentanes and heavier, are substantially completely destroyed in the primary reforming step, so the equilibria involved are defined to residual methane, hydrogen, steam and carbon oxides, in accordance with the principal equations:

$$CH_4 + H_2O \rightarrow CO + 3H_2$$
$$CH_4 + 2H_2O \rightarrow CO_2 + 4H_2$$

Ammonia synthesis gas requires a ratio of 3 moles of hydrogen for each mole of nitrogen and the nitrogen is usually admitted to the process in the form of compressed air which is mixed with the primary reformer exit gas in the secondary reformer, R-2, a reaction vessel which also contains a suitable catalyst, such as a nickel-bearing compound.

In the secondary reformer, R-2, the oxygen in the air enters into highly exothermic combustion reactions with hydrogen, carbon monoxide, and residual methane, completely converting the oxygen to a combined form. This combustion provides the energy to elevate the total process stream to 1650° F.–2000° F., at which temperature residual methane is largely converted to carbon oxides and hydrogen, thus keeping methane in the ammonia synthesis gas to a low value. In a practical operating plant overall methane conversion is more than 95%, and frequently the operating conditions are adjusted to achieve more than 99% conversion.

Shift conversion may be done in a single converter, or may be done in more than one step as shown in the figure by high temperature shift converter C-1 and low temperature shift converter C-2. In shift conversion most of the carbon monoxide from primary and secondary reforming is converted to carbon dioxide in accordance with the reaction $H_2O + CO \rightarrow CO_2 + H_2$. This reaction is favored by an excess of steam, and it is usually desirable to adjust operating conditions so that there is more than 90% overall conversion to carbon dioxide so as to minimize the later removal of carbon monoxide. The shift reaction is exothermic, and where a single shift converter is used, it is customary to maintain temperature conditions in the converter in the range of 600° F. to 800° F. Conversion to carbon dioxide is favored at the lower temperature.

The exit stream from shift conversion, for example, the stream from low temperature shift converter C-2, is composed of crude synthesis gas and surplus steam. It is important to recover efficiently as much heat as possible from this stream, especially the latent heat of condensation of the surplus steam. In modern plants this heat from condensation of the surplus steam is used, as shown in the figure at E-2, to regenerate the foul solutions, such as aqueous monoethanolamine or potassium carbonate, used to remove carbon dioxide from the crude synthesis gas at Y-1.

Following the above step of thermochemical heat recovery, crude synthesis gas is separated from the condensed steam, is further cooled, and any remaining water vapor is removed, as typically shown at S-1, E-3, and S-2, respectively. The crude synthesis gas is then purified by removal of carbon dioxide and carbon monoxide, as shown at Y-1. After the purification, the synthesis gas is compressed by synthesis gas compressors, as shown at X-3, to full synthesis pressure, usually 300 atmospheres or higher.

Broadly, my improved method consists of vaporizing a part or all of the contaminated process condensate and recycling it to primary reforming to convert the contaminants back to nitrogen, hydrogen and carbon oxides.

In a preferred form of my improved method, contaminated process condensate, which is produced by condensation of the surplus steam after shift conversion, is revaporized in a confined zone, by heat exchange with the product of secondary reforming and/or the combustion gases from primary reforming, and the contaminated steam thus produced is recycled back into the zone of primary reforming where the contaminants are converted back to nitrogen, hydrogen and oxides of carbon at the high operating temperatures existing in primary reforming. To accomplish the latter, novel operating conditions in the process sequence must be established so that enough energy is available, at a sufficiently high thermodynamic level, to permit the revaporization of the process condensate. These conditions simultaneously render available in the combustion gases from primary reforming and/or the product of secondary reforming a surplus of heat in addition to that needed for producing process steam, which surplus heat is capable of producing a large amount of surplus uncontaminated steam at a high pressure level. This large steam production capability results from a very high thermal efficiency due to such novel operating conditions. Under the conditions o fthe example the amount of that surplus is sufficient to provide most of the compression power requirements for the synthesis gas and ammonia plant. This result has not heretofore been accomplished.

The following example further illustrates my invention and sets forth the most preferred conditions for its use. The quantities and data presented are based on a plant capable of producing synthesis gas equivalent to approximately 200 tons per day of anhydrous ammonia.

EXAMPLE

Compressed and purified natural gas, approximately 4,250,000 s.c.f.d., is admitted to the preheater coil of the primary reformer furnace, R–1, shown in the figure, where it is admixed with 53,000 lbs. per hour of steam from boilers B–1, B–2 and B–3, and the mixture is preheated to 800° F. prior to entry into the catalyst-filled reformer tubes. Pressure at the inlet to the primary reformer is 440 p.s.i.g. The reaction mixture has a steam-to-carbon ratio of six (i.e. six atoms of oxygen in the steam for each atom of carbon in the natural gas) in the primary reformer tubes, which are externally fired. Approximately 85% of the hydrocarbons are converted, by catalytic reaction with steam, to hydrogen and carbon oxides at an exit temperature slightly below 1500° F. Primary reformer waste heat boiler, B–1, generates 37,000 lbs. per hour of steam at a pressure of 475 p.s.i.g. Of this quantity, 5,200 pounds per hour, about 14% of the total produced in that boiler, are admitted to the process stream through valve V–1, the remaining 31,800 lbs. per hour of steam being withdrawn as surplus.

It is a novel feature of my improved method that only a small percentage of the heat available in the combustion gases from primary reforming is needed for producing process steam, resulting in a surplus of heat capable of generating high-pressure steam in primary reformer waste heat boiler B–1 to supply most of the synthesis gas and ammonia plant compression power requirements. That available heat in the primary reformer combustion gases is hereinafter expressed in terms of high-pressure steam generated in boiler B–1. The percentage of such steam needed for the process will vary with operating pressure and the steam-to-carbon ratio in the primary reforming step, but in my improved method less than 50% and preferably less than 25% of the amount of steam produced in the primary reformer waste heat boiler is needed for the process.

The process exit stream from primary reformer, R–1, goes to secondary reformer, R–2, where it is reacted with air which has been compressed to slightly above process pressure at X–1. The quantity of air is controlled to give an ultimate synthesis gas with a 3 to 1 ratio of hydrogen to nitrogen. In the secondary reformer, R–2, the catalyst converts substantially all of the remaining hydrocarbons to hydrogen and carbon oxides. The secondary reformer exit stream has a temperature of approximately 1700° F. and a pressure of approximately 415 p.s.i.g.

Secondary reformer waste heat boiler, B–2, produces 41,800 pounds per hour of steam at 450 p.s.i.g., feed to the boiler being a blend of hot process condensate from separator S–1, process condensate from separator S–2, and make-up steam condensate from tank T–1. Valve V–2, situated in the line carrying steam generated in boiler B–2, provides a convenient method of adding steam to the process stream to reduce the temperature at the entrance to high temperature shift converter C–1. Process stream exit temperature from waste heat boiler, B–2, is 730° F.

High temperature shift converter, C–1, contains a conventional catalyst, such as a chrome-iron material, and converts 70% to 95% of the incoming carbon monoxide to carbon dioxide. The converter may contain a plurality of beds with intermediate temperature control by steam or water quenching if maximum conversion is desired. Temperature rise in C–1 is 70° F. resulting in an exit temperature of 800° F. Operating range in the converter may vary from about 650° F. to about 850° F.

From C–1 the process stream passes through heat exchanger E–1 where methanator feed gas, which is synthesis gas after $CO_2$ removal and prior to CO removal, is preheated to the customary level of 500° F. to 550° F. Alternatively, this exchanger can be located on the inlet stream side of shift converter C–1.

From E–1 the process stream passes through waste heat boiler B–3, where 6,000 pounds per hour of steam is generated at 450 p.s.i.g. Feed to the boiler is a blend of water sources similar to that used in B–2. Valve V–3 in the steam line from B–3 may be used to add steam to the process to reduce the temperature and increases the steam content of the entrance stream to low temperature shift converter C–2. This shift converter contains a catalyst capable of conversion of carbon monoxide to carbon dioxide within the temperature limits specified below. Exit temperature of the process stream from B–3 is approximately 500° F. Operating temperature in C–2 can be as high as 550° F. and can be reduced to as low as 350° F. by recycling some process condensate through valve V–4. Temperature rise in the low temperature shift converter C–2 is slight and exit temperature is preferably about 425° F. The exit gases contain 0.1% to 0.3% carbon monoxide at this point.

Process gas from C–2 is desuperheated by injection of condensate through valve V–5 and passes to thermochemical heat recovery units, E–2, where most of the water vapor is condensed, the heat of condensation being used to regenerate in the usual manner the foul solutions used to remove carbon dioxide from the crude synthesis gas. In separator S–1, at a temperature of approximately 260° F., and a pressure of 400 p.s.i.g., the hot process condensate is separated from the process stream. The hot condensate produced, amounting to 36,400 pounds per hour of water at 260° F., is pumped by P–2 to boilers B–2 and B–3 and ultimately into the preheater and the primary reformer R–1. This condensate contains the bulk of fixed nitrogen contaminants and is saturated with carbon dioxide.

Vapors from S–1 are cooled in exchanger E–3 to approximately 110° F., under which condition substantially all of the remaining water vapor is condensed. Separator S–2 separates the cold process condensate from crude synthesis gas. This cold condensate, 4,400 pounds per hour, contains the remainder of the fixed nitrogen contaminants and is saturated with carbon dioxide. The cold condensate is pumped by P–3 back to boilers B–2 and B–3 and to the preheater and the primary reformer R–1, as in the case of hot condensate from S–1.

Condensate tank T–1 contains make-up condensate from any convenient extraneous source. Pump P–5 transfers 7,000 pounds per hour to B–2 and B–3 to provide a total of 47,800 pounds per hour of water for steam generation in B–2 and B–3.

In B–2 and B–3 the evaporation temperature is 460° F. under which condition the contaminants in the process condensate are volatilized and passed back through the preheater into the primary reformer R–1. At the temperature levels in the primary reformer the contaminants are converted to nitrogen, hydrogen and carbon oxides, thereby removing the pollution problem and the necessity for chemical treatment of process condensate.

In addition to removing the problem of contamination of process condensate, the foregoing example shows how an extraordinary amount of uncontaminated by-product, high-pressure steam has been produced from use of my improved method. Many variations of the process sequence and operating conditions are possible, for example, a single shift converter may be used and boiler B-3 may be eliminated in that event, but the following conditions should be maintained to achieve the preferred form of my method where substantially all of the contaminated process condensate is revaporized by exchange with the process stream and the contaminated steam thus produced is recycled and admitted to the primary reformer.

(1) The energy content of the process stream from the secondary reformer must be great enough to heat and vaporize the process condensate in addition to preheating the methanator feed gas and supplying the energy required for subsequent removal of carbon dioxide from crude ammonia synthesis gas. To accomplish this, in most instances the steam-to-carbon ratio in primary reforming should be at least 4.5 and the operating pressure at the secondary reformer outlet should be at least 290 p.s.i.a., and more preferably those conditions should be at least 5.5 and 370 p.s.i.a., respectively.

The former minimum conditions are disclosed in my co-pending application Serial No. 87,702, filed February 7, 1961, now U.S. Patent No. 3,081,268, but in its broad form my improved method is not dependent on those conditions and the preferred form of my method may be utilized while using even higher steam-to-carbon ratios and higher such pressures than those specified in that co-pending application.

(2) Process condensate should be revaporized at a sufficiently high thermal level (a) to volatilize the contaminants and (b) to permit re-entry of the contaminated steam into the primary reformer furnace. More specifically, the process condensate should be revaporized by heat exchange with the product of secondary reforming at a temperature between the limits of 430° F. and 500° F. and the amount of condensate so vaporized should be at least about three moles for each mole of carbon in the hydrocarbon feed added to primary reforming. The term "product of secondary reforming" is used in the specification and claims to include the exit stream from secondary reforming and, where shift conversion is done in two steps, as exemplified in the figure, also to include the exit stream from the high temperature shift converter, such as the stream entering boiler B-3 in the figure.

(3) The pressure at which uncontaminated steam is produced for addition to process should be higher than the pressure level at which contaminated steam is produced in order that the streams may be segregated i.e., so that the contaminated steam does not admix with the uncontaminated steam which is not admitted to the process.

Under certain circumstances it may be permissible to discard a portion or even all of the contaminated process condensate from the plant without creating a serious pollution problem. In that event fresh water may replace the process condensate. Even though all process condensate is discarded the preferred form of my improved method may still be used to produce a large amount of surplus uncontaminated steam, but then, of course, the third condition above need not be maintained.

Whether process condensate or fresh water is used under the preferred conditions stated above, assuming the steam produced in the primary reformer waste heat boiler to be at a pressure slightly in excess of the pressure at the primary reformer inlet, less than 50% and preferably less than 25% of that amount is required for use as process steam. That amount may, of course, be supplied from other sources and all of the steam withdrawn from the primary reformer waste heat boiler, but the net result is the same as though a portion of the latter were admitted to the process.

For purposes of illustration I have shown condensate being vaporized by exchange with the product of secondary reforming, and the surplus high-pressure steam being generated in waste heat boiler B-1. It will be apparent that the condensate (or fresh water replacing it all or in part as contemplated above) may be vaporized by exchange with the combustion gases from primary reforming, in which event surplus high-pressure steam may be generated by exchange of water with the product of secondary reforming. Also, the condensate (or the fresh water replacing it) which is admitted to primary reforming may be split and a part may be generated by exchange with those combustion gases and a part by exchange with the product of secondary reforming, in which event the additional steam furnishing the surplus may also be split and in like manner a part may be generated by exchange with those combustion gases and a part by exchange with the product of secondary reforming. In either case this would still be within the scope of the preferred form of my invention.

In the foregoing example, contaminated process condensate has been vaporized in two separate evaporators, boilers B-2 and B-3. Under certain circumstances one or the other of these boilers can be devoted to the evaporation of uncontaminated water, or boiler B-3 can be eliminated but this does not depart from the scope of the preferred form of my invention. Under certain circumstances it may also be desirable to eliminate contact of corrosive compounds, such as dissolved $CO_2$, with either or both boilers B-2 and B-3 by stripping the incoming contaminated condensate by countercurrent contact with the steam produced in these boilers, but that preferred form is not limited by the manner of introduction of process condensate into those boilers.

I claim:

1. In the process of producing ammonia synthesis gas from hydrocarbons by the steps of primary catalytic reforming the hydrocarbons with steam, secondary catalytic reforming with air the product of primary reforming, the pressure during said step of secondary catalytic reforming being at least 290 p.s.i.a., shift conversion of the product of secondary reforming, cooling the product of shift conversion to condense the steam therein and separate the condensate from the synthesis gas, a method for disposing of contaminants resulting from such process and contained in said condensate which comprises vaporizing substantially all of the contaminant-containing condensate and admitting the resulting contaminant-containing steam to the zone of primary reforming thereby to decompose the contaminants therein.

2. The method of claim 1 wherein said contaminants are stripped from said contaminant-containing condensate prior to its vaporization by countercurrent contact of said condensate with at least a part of said steam.

3. The method of claim 1 wherein said condensate is vaporized at a temperature in the range of 430°–500° F.

References Cited

UNITED STATES PATENTS

| 2,610,106 | 9/1952 | Gray | 252—376 X |
|---|---|---|---|
| 3,081,268 | 3/1963 | Marshall | 252—376 |
| 1,923,656 | 8/1933 | Beekley | 23—212 |
| 2,795,559 | 6/1957 | Whaley | 252—376 X |
| 2,829,113 | 4/1958 | Barry et al. | 252—376 |
| 3,097,081 | 7/1963 | Eastman et al. | 48—215 |

LEON ZITVER, *Primary Examiner.*

H. MARS, B. HELFIN, *Assistant Examiners.*

UNITED STATES PATENT OFFICE
CERTIFICATE OF CORRECTION

Patent No. 3,367,882 February 6, 1968

Walton H. Marshall, Jr.

It is certified that error appears in the above identified patent and that said Letters Patent are hereby corrected as shown below:

Column 1, line 64, "defined" should read -- confined --.

Signed and sealed this 10th day of March 1970.

(SEAL)
Attest:

Edward M. Fletcher, Jr.  WILLIAM E. SCHUYLER, JR.
Attesting Officer  Commissioner of Patents